Sept. 14, 1948.  D. E. SUTTON  2,449,519
BELT TIGHTENING AND TRACKING DEVICE
Filed April 8, 1946
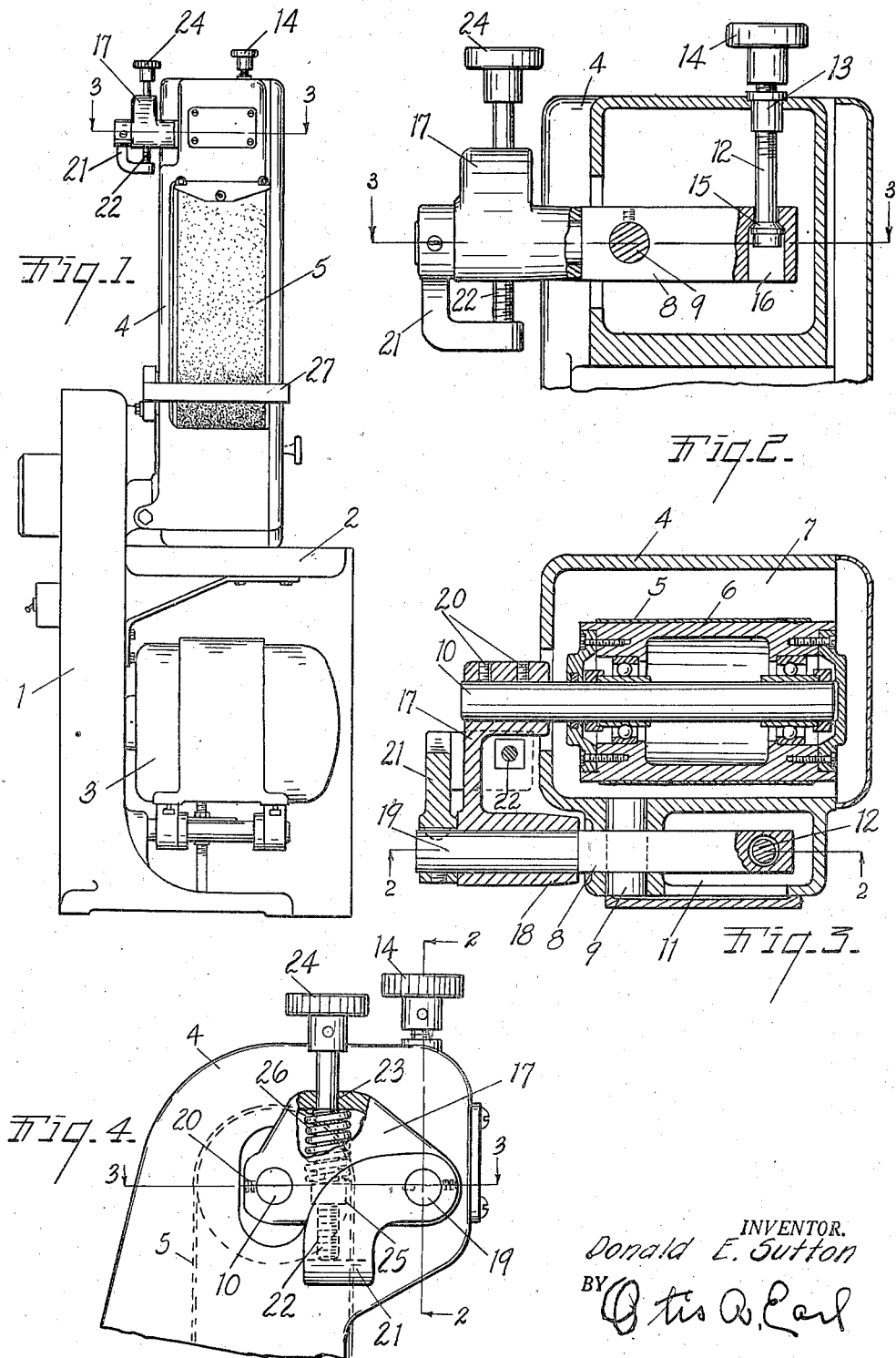
INVENTOR.
Donald E. Sutton
BY Otis A. Earl
ATTORNEY Patented Sept. 14, 1948

2,449,519

UNITED STATES PATENT OFFICE 2,449,519

BELT TIGHTENING AND TRACKING DEVICE

Donald E. Sutton, Kalamazoo, Mich., assignor to Hammond Machinery Builders, Inc., Kalamazoo, Mich., a corporation of Michigan Application April 8, 1946, Serial No. 660,351

2 Claims. (Cl. 51—148)

This invention relates to improvements in belt tightening and tracking device.

The main objects of this invention are:

First, to provide a belt tightening and tracking device for belt grinding machines and the like which provides very efficient support for the belt and quick and accurate adjustment therefor.

Second, to provide a structure having these advantages which is compact and simple.

Objects relating to details and economies of the invention will appear from the description to follow. The invention is defined and pointed out in the claims.

A structure which embodies the features of the invention is illustrated in the accompanying drawing, in which:

Fig. 1 is a front elevation of a belt grinding machine embodying my invention, certain parts being shown conventionally.

Fig. 2 is an enlarged fragmentary view partially in section on line 2—2 of Figs. 3 and 4.

Fig. 3 is a view mainly in section on line 3—3 of Figs. 1 and 4.

Fig. 4 is a fragmentary elevational view looking from the left of Figs. 1, 2, and 3.

It will be understood that I am employing the word "grinding" in its broad sense to include polishing, deburring, beveling, descaling and similar operations on metals, plastics, ceramics, glass and the like.

In the accompanying drawing 1 represents the base of the machine which is provided with a drip pan 2, and motor 3 mounted below the drip pan. These parts are shown conventionally. The driving gear is housed within the base and as it forms no part of this invention, it is not illustrated.

The pedestal or belt support 4 is mounted on the base 1, it being shown in upright position in the drawing although for certain work it is disposed in horizontal position. The grinding belt 5 is supported by a lower driven pulley not illustrated, housed in the bottom of the pedestal, and the upper pulley 6 arranged in a pulley chamber 7 provided in the upper end of the pedestal. This pulley 6 is supported for belt tensioning adjustment and also belt tracking adjustment.

The spindle supporting bar 8 is mounted on the pivot 9 disposed transversely of and in the plane of the spindle 10 of the pulley. This spindle support 8 projects into the chamber 11 at the front of the chamber 7 to receive the supporting and adjusting screw 12 which is threaded into the supporting nut 13, carried by the pedestal, the screw being provided with a hand piece 14 on its outer end. On its inner end the screw is provided with a head 15 having swiveling engagement with the shoulder bore 16 so that by rotating the screw through its hand piece 14 the member 8 is tiltingly adjusted on its pivot 9 and supported in its adjusted position.

The chambered bracket 17 is pivotally or swingably mounted on the outer end of the support 8, the bracket having a hub portion 18 engaging the cylindrical portion 19 of the support.

The spindle 10 is secured in the outer or swinging end of the bracket by means of the set screws 20. At its outer end the member 8 is provided with an arm 21 having a laterally turned portion disposed below the bracket 17 to thrustingly support the tensioning or belt-tightening screw 22. This screw is arranged through the opening 23 in the top of the bracket 17 and is provided with a hand piece 24 at its outer end. The screw is provided with a thrust abutment 25 for the spring 26, the upper end of the spring engaging the bracket. The thrust abutment 25 is threaded on the screw so that the tension of the spring may be varied.

With this arrangement of parts, the pulley 6 is supported so that it may be quickly and easily adjusted for securing proper tracking of the belt and also tensioning of the belt in its various adjusted positions.

The work supporting table is conventionally shown at 27.

I have not attempted to illustrate or describe various modifications and adaptations of my invention which might be desirable for particular uses as it is believed that this disclosure will enable those skilled in the art to adapt or embody my invention as may be desired.

Having thus described my invention, what I claim as new and desire to secure by Letters Patent is:

1. In a belt tightening and tracking device, the combination with a pedestal provided with a housing having a downwardly opening pulley chamber therein and an auxiliary chamber disposed at the side of the pulley chamber, a pulley arranged in said pulley chamber, a spindle for said pulley projecting from said pulley chamber, a spindle supporting bar disposed in said auxiliary chamber to project therefrom and in parallel relation to said spindle a pivot pin extending through said bar disposed transversely of the spindle and in substantially the plane thereof and supported in the walls of said auxiliary chamber, an adjusting screw for said bar having rotating engagement with the inner end thereof, a nut coacting with said screw carried by said housing, a chambered supporting bracket for said spindle rotatably mounted on the outer end of said bar, an arm on the outer end of said bar projecting below said supporting bracket, a tensioning screw disposed through said bracket in thrust engagement with said arm, and a coiled spring arranged on said tensioning screw in engagement with said bracket, said tensioning screw being provided with a threaded abutment for said spring.

2. In a machine of the class described, the combination with a pulley and spindle thereof, of a spindle supporting member disposed in parallel relation to the spindle and provided with a pivot disposed transversely of the spindle, a threaded adjusting means for said support member, a spindle supporting bracket rotatably mounted on said supporting member for axial tilting adjustment therewith, an arm on the outer end of said supporting member projecting below said bracket, a tensioning screw disposed through said bracket in supporting engagement with said arm and having a threaded abutment thereon, and a coiled spring arranged on said screw between said abutment and bracket.

DONALD E. SUTTON.

REFERENCES CITED

The following references are of record in the file of this patent:

UNITED STATES PATENTS

| Number | Name | Date |
| --- | --- | --- |
| 1,665,749 | Mattison | Apr. 10, 1928 |
| 1,916,543 | Welch | July 4, 1933 |
| 2,254,346 | Bazzoni | Sept. 2, 1941 |
| 2,367,107 | Emmons | Jan. 9, 1945 |
| 2,368,848 | Krueger | Feb. 6, 1945 |